(12) United States Patent
Williams et al.

(10) Patent No.: US 7,781,492 B2
(45) Date of Patent: Aug. 24, 2010

(54) FOAM/AEROGEL COMPOSITE MATERIALS FOR THERMAL AND ACOUSTIC INSULATION AND CRYOGEN STORAGE

(75) Inventors: Martha K. Williams, Titusville, FL (US); Trent M. Smith, Melbourne, FL (US); James E. Fesmire, Titusville, FL (US); Erik S. Weiser, Yorktown, VA (US); Jared P. Sass, Rockledge, FL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 216 days.

(21) Appl. No.: 11/759,672

(22) Filed: Jun. 7, 2007

(65) Prior Publication Data

US 2008/0087870 A1 Apr. 17, 2008

Related U.S. Application Data

(60) Provisional application No. 60/804,235, filed on Jun. 8, 2006.

(51) Int. Cl.
*C08G 73/10* (2006.01)
*C08K 3/36* (2006.01)

(52) U.S. Cl. .................. 521/183; 521/184; 521/185; 524/492; 524/493; 523/218

(58) Field of Classification Search .................. 521/180, 521/183–185; 524/493, 494, 492; 523/218
See application file for complete search history.

(56) References Cited

U.S. PATENT DOCUMENTS

| | | | |
|---|---|---|---|
| 4,966,919 A * | 10/1990 | Williams et al. ............... 521/54 |
| 5,137,927 A | 8/1992 | Wolff et al. |
| 5,306,555 A | 4/1994 | Ramamurthi et al. |
| 5,565,142 A | 10/1996 | Deshpande et al. |
| 5,612,410 A * | 3/1997 | Kondo et al. ................. 510/347 |
| 5,680,713 A | 10/1997 | Forbert et al. |
| 5,795,556 A | 8/1998 | Jansen et al. |
| 5,994,418 A | 11/1999 | Weiser et al. |
| 6,040,375 A * | 3/2000 | Behme et al. ................ 524/492 |
| 6,084,000 A | 7/2000 | Weiser et al. |
| 6,133,330 A | 10/2000 | Weiser et al. |
| 6,136,216 A | 10/2000 | Fidler et al. |
| 6,180,746 B1 | 1/2001 | Weiser et al. |
| 6,222,007 B1 | 4/2001 | Cano et al. |
| 6,235,803 B1 | 5/2001 | Weiser et al. |
| 6,967,051 B1 | 11/2005 | Augustynowicz et al. |
| 7,074,880 B2 | 7/2006 | Rhine et al. |
| 7,144,522 B2 | 12/2006 | Burchill et al. |
| 2005/0074566 A1 | 4/2005 | Rouanet et al. |
| 2005/0096661 A1 * | 5/2005 | Farrow et al. .................. 606/79 |
| 2006/0218940 A1 | 10/2006 | Starkovich |
| 2006/0248854 A1 * | 11/2006 | Bartley-Cho et al. ....... 52/782.1 |
| 2006/0254088 A1 | 11/2006 | McCormick |
| 2006/0264132 A1 | 11/2006 | Leeser et al. |
| 2007/0102055 A1 | 5/2007 | Blair et al. |
| 2007/0259979 A1 * | 11/2007 | Lee ............................ 521/64 |
| 2007/0289974 A1 * | 12/2007 | Blair et al. ............. 220/560.15 |

FOREIGN PATENT DOCUMENTS

WO WO9807780 2/1998

OTHER PUBLICATIONS

Kistler, S.S. 1932. Coherent expanded-aerogels. J. Physical Chemistry 36:52-64.
Gesser and Goswanni. 1989. Aerogels and related porous materials. Chem. Rev. 89:767.
Pekala, R.W. 1989. Organic aerogels from the polycondensation of resorcinol with formaldehyde. J. Material Science 24:3221-3227.
Lemay, J.D. 1991. Mechanical structure-property relationships of microcellular, low density foams. Materials Research Society Symposium Proceedings 207 (Mech. Prop. Porous Cell. Mater.: 21-26.
Williams, M.K. et al. 2005. Effects of cell structure and density on the properties of high performance polyimide foams. Polymers for Advanced Technologies 16:167-174.
Rigacci, A. et al. 2004. Preparation of polyurethane-based aerogels and xerogels for thermal superinsulation. J. Non-crystalline Solids 350:372-378.

* cited by examiner

*Primary Examiner*—Peter Szekely
(74) *Attorney, Agent, or Firm*—Randall M. Heald; Hugh McTavish

(57) ABSTRACT

The invention involves composite materials containing a polymer foam and an aerogel. The composite materials have improved thermal insulation ability, good acoustic insulation, and excellent physical mechanical properties. The composite materials can be used, for instance, for heat and acoustic insulation on aircraft, spacecraft, and maritime ships in place of currently used foam panels and other foam products. The materials of the invention can also be used in building construction with their combination of light weight, strength, elasticity, ability to be formed into desired shapes, and superior thermal and acoustic insulation power. The materials have also been found to have utility for storage of cryogens. A cryogenic liquid or gas, such as $N_2$ or $H_2$, adsorbs to the surfaces in aerogel particles. Thus, another embodiment of the invention provides a storage vessel for a cryogen.

8 Claims, 5 Drawing Sheets

FOAM/AEROGEL COMPOSITE MATERIALS FOR THERMAL AND ACOUSTIC INSULATION AND CRYOGEN STORAGE

CROSS-REFERENCE TO RELATED APPLICATIONS

The application claims the benefit, under 35 U.S.C. §119(e), of U.S. Provisional Application Ser. No. 60/804,235, filed Jun. 8, 2006, the contents of which are incorporated herein by reference.

ORIGIN OF INVENTION

The invention described herein was made by employees of the United States Government and may be manufactured and used by or for the Government of the United States of America for governmental purposes without the payment of any royalties thereon or therefor.

BACKGROUND OF THE INVENTION

High-performance polyimides are presently employed in a number of applications, for example in joining metals to metals, and in joining metals to composite structures in the aerospace industry. In addition, polyimides are rapidly finding new uses as foam insulation in cryogenic applications and as structural foam, having increased structural stiffness without large weight increases. Foams of various densities and thermal and mechanical properties are now being required for future reusable launch vehicles, maritime ships, and aircraft. Polyimide foam materials have a number of beneficial attributes in these applications, such as high temperature and solvent resistance, flame resistance, low smoke generation, high modulus and chemical and hot water resistance.

Most polymeric cellular solids do not perform well at cryogenic temperatures, are not chemically stable, and are not inherently flame retardant or thermally stable. One polyimide foam is TEEK H developed at NASA Langley Research Center. (U.S. Pat. Nos. 5,994,418; 6,084,000; 6,133,330; 6,180,746; 6,222,007; 6,235,803; and Williams et al. (2005), "Effects of cell structure and density on the properties of high performance polyimide foams," *Polymers for Advance Technologies*, 16, 167-174, which are hereby incorporated by reference). TEEK polyimide foam performs well physically, thermally, chemically, and is flame retardant, but improvements are possible.

Improved thermal performance translates to less material required to achieve the same insulation performance, resulting in lighter vehicles. Improved foam materials that have increased thermal and acoustic insulation power with the same or less weight are needed for aerospace, maritime, and other uses.

SUMMARY OF THE INVENTION

The invention involves adding aerogel, which is a material with very low thermal conductivity and excellent acoustic insulation, to a polymer foam to form a composite material. The composite materials have improved thermal insulation ability and excellent physical mechanical properties that make them usable at both extremely low temperatures and extremely high temperatures.

The most common aerogels are composed of silica, and these are flame resistant and maintain their excellent thermal insulation properties at both very low temperatures, e.g., −196° C. (77 K), and very high temperatures, e.g., 200° C. (473 K) or 300° C. (573 K). Preferably the foam is also flame resistant and maintains its insulation properties and mechanical properties, e.g., structure, strength, flexibility, and stability, at both high and low temperatures.

The composite materials have some improved characteristics over the polymer foam because the aerogel improves the thermal insulation and acoustic insulation properties of the polymer foam. Aerogels can provide significant improvements in acoustic damping and reduction in sound transmission. Aerogels can exhibit unexpected attenuation for well-defined frequency bands.

The composite materials also have improved characteristics over the aerogel. Aerogel is very brittle and stiff and difficult to form into desired shapes. The polymer foam adds improved mechanical properties and a reduction in flexural stiffness to the aerogel. The composite materials are also easier to form into desired shapes than aerogels are.

Heat transfer occurs through solid conduction, gas convection (and conduction for low pressures), and radiation. The thermal performance of the composite materials is improved in the following ways. First, the aerogel component reduces the solid-solid contact points and thus reduces heat transfer by solid conduction. Second, the aerogel also reduces the gas convection inside the material due to its nanoporous internal structure. Thus, the overall heat transfer through the composite is further reduced. Third, the invention can also incorporate radiation shielding elements to reduce the radiant heat transfer. These elements can comprise, but are not limited to, aluminum powder or flakes, carbon black, or even embedded layers of aluminum foil or aluminized polymeric film. Higher temperature applications would benefit more by the inclusion of these optional radiation shielding elements.

It as an object of the invention to provide a foam-like product that can be used, for instance, for heat and acoustic insulation on aircraft, spacecraft, and maritime ships in place of currently used foam panels and other foam products. The materials of the invention can also be used in building construction with their combination of light weight, strength, elasticity, ability to be formed into desired shapes, and superior thermal and acoustic insulation power.

The materials have also been found to have utility for storage of cryogens. A cryogenic liquid or gas, such as $N_2$ or $H_2$, adsorbs to the surfaces in aerogel particles. The small pore sizes and sharp angles of curvature in the pores of aerogels alter the thermodynamic state of adsorbed cryogen from the bulk fluid state. The adsorbed fluid has a greatly reduced vapor pressure and a higher effective vaporization enthalpy ($H_v$) than the bulk liquid. The enormous surface area of aerogel provides a large capacity for cryogen adsorption and storage. This allows storage of the cryogen at a high density with a reduced boil-off rate. The composite materials also facilitate more effective handling of cryogenic fluids (liquid and vapor phase) in space at zero or reduced gravity.

In the composite materials, a mostly open-cell foam allows cryogen access to the aerogel, but holds the aerogel in place, which prevents movement of aerogel beads or sloshing of fluid mixed with the aerogel. The foam also provides insulation around the aerogel, which reduces the boil-off rate of cryogen from the aerogel.

Liquid hydrogen and oxygen are stored as fuel on spacecraft. The fuel tanks experience extraordinary variances of temperature. The interior of the tank is at −253° C. (20 K), the boiling point of hydrogen, and the exterior can be at over 200° C. (473 K) due to friction with air on takeoff or landing. Thus, materials capable of performing at both these temperature extremes are required.

Cryogenic fluids are typically stored in vacuum-jacketed vessels that are hollow and contain the fluid in the same way a cup does. With movement in ground, air, and space vehicles, slosh can be a problem in such containers. Additionally, a broken vacuum can result in a rapid pressure increase due to boil off of the cryogen, which can lead to a hazardous situation. An impact that breaks the vessel also would cause liquid to leak and rapid boil off, resulting in a very hazardous situation with a fuel such as liquid hydrogen. Storage in the composite materials solves these problems of slosh and susceptibility to an impact that would cause liquid leakage and rapid boil off. The cryogenic fluid is nano-sequestered in aerogel pores, so that no bulk liquid is present that can rapidly leak out. The foam provides insulation for the aerogel to slow the rate of boil off, even if the material is torn by shrapnel.

Thus, one embodiment of the invention provides a flame resistant composite material comprising a flame-resistant polymer foam containing a flame-resistant aerogel.

Another embodiment of the invention provides a composite material comprising a polyimide foam containing an aerogel.

Another embodiment of the invention provides a cryogen storage apparatus comprising: (a) a composite material comprising: (i) a polymer foam; containing and holding immobile relative to the polymer foam and (ii) an aerogel; wherein the polymer foam forms one or more openings through the foam that allow fluid access to the aerogel; and the aerogel provides a storage medium for a cryogen.

Another embodiment of the invention provides a cooling apparatus comprising: (a) a composite material comprising: (i) a polymer foam containing and holding immobile relative to the polymer foam and (ii) an aerogel; wherein the polymer foam forms one or more openings through the foam that allow fluid access to the aerogel; the aerogel provides a storage medium for a cryogen; and the apparatus is adapted to store a cryogen in the aerogel to cool a space surrounding the apparatus.

Another embodiment of the invention provides a method of storing a cryogen gas or fluid comprising: contacting the cryogen with a composite material comprising (a) a polymer foam containing and holding immobile relative to the polymer foam and (b) an aerogel; wherein the polymer foam forms openings through the foam that allow fluid access to the aerogel; the aerogel provides a storage medium for a cryogen; and the cryogen passes through the one or more openings through the polymer foam to contact the aerogel for storage.

Another embodiment of the invention provides an article of manufacture comprising a composite material of the invention.

DETAILED DESCRIPTION OF THE INVENTION

Figure 1:
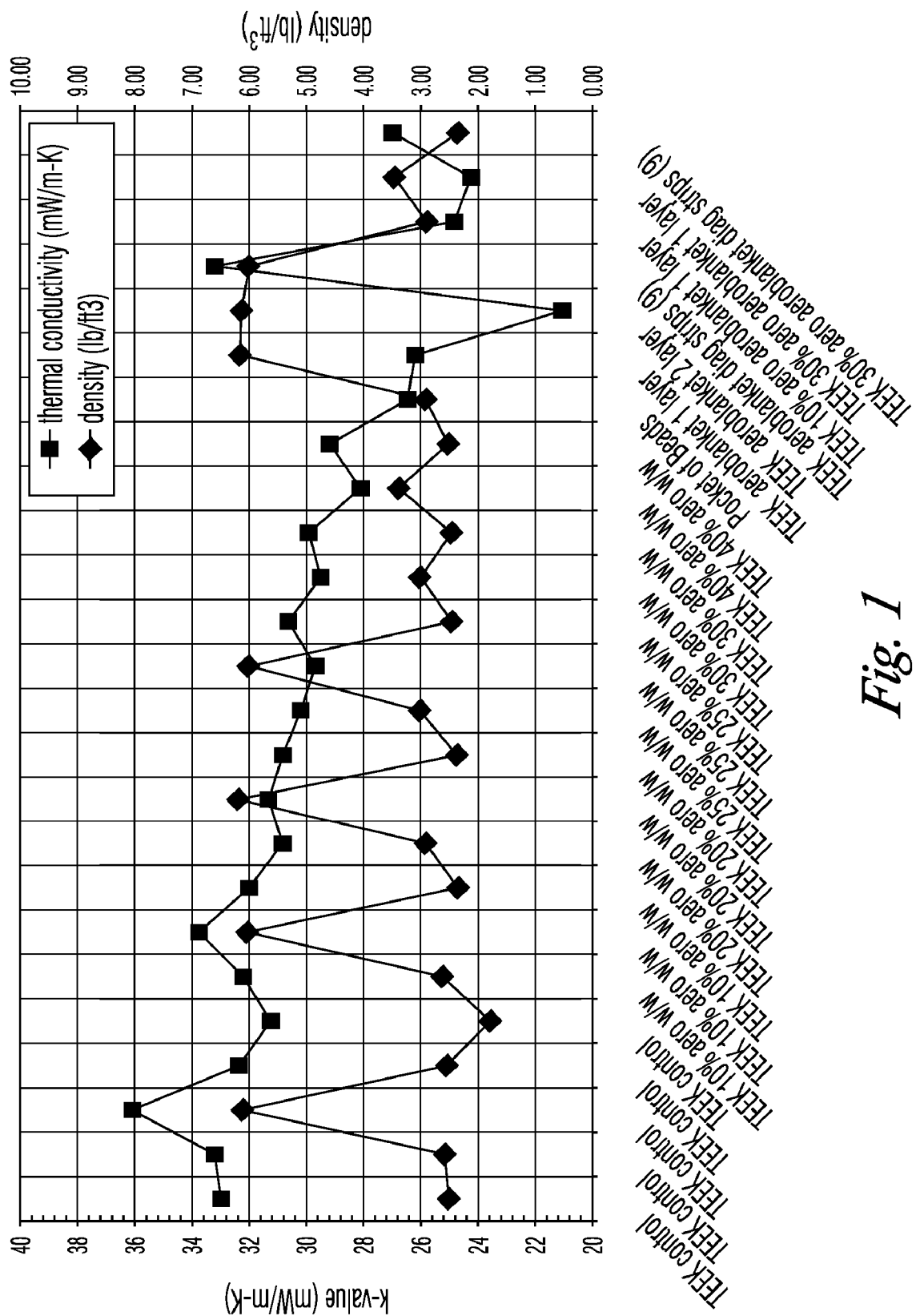
FIG. 1 is a plot of thermal conductivity and density measurements of individual TEEK and TEEK/aerogel composite foam materials.

A "flame resistant" material, as used herein, refers to a material that has an oxygen index of 25% or above. The "oxygen index" of a material refers to the lowest percent of oxygen in an oxygen/nitrogen atmosphere in which the material will just maintain candle-like burning when ignited from above.

Peak heat release rates (PHRRs) are another measure of the degree of flame resistance. PHRRs are determined using ASTM E1354. Cone calorimetry analysis utilizes the oxygen consumption principle during combustion as a measure of heat release. The rate of heat release is a major factor that determines the size of a fire. The oxygen consumption principle states that there is a constant relationship between the mass of oxygen consumed from the air and the amount of heat released.

The term "PITA" as used herein refers to composite materials with a pocket of aerogel particles within an envelope of foam.

As used herein, the term "aerogel" refers to a highly porous material of low density, which is prepared by forming a gel and then removing liquid from the gel while substantially retaining the gel structure. Aerogels have open-cell microporous or mesoporous structures. Typically, they have pore sizes of less than 200 nm and surface areas of greater than 100 $m^2$ per gram. They often have low densities, e.g., from 200 mg/cc down to as little as 1 mg/cc.

According to a narrower definition, aerogels are materials in which the liquid has been removed from the gel under supercritical conditions. Most commonly the liquid is removed with supercritical carbon dioxide. The term "xerogel" as used herein refers to a type of aerogel in which the liquid has been removed from the gel by a process other than supercritical fluid extraction, including drying under subcritical conditions or removal of the liquid from the frozen state by sublimation.

The most common aerogel material is silica ($SiO_2$). Other materials can be used, including other metal oxides such as alumina ($Al_2O_3$), carbon, and polymers such as polyimide.

Aerogels are commercially available from several sources. Aerogels prepared by supercritical fluid extraction or by subcritical drying are available from Cabot Corp. (Billenca, Mass.), Aspen Aerogel, Inc. (Northborough, Mass.), Hoechst, A.G. (Germany), and American Aerogel Corp. (Rochester, N.Y.).

Aerogels can be prepared by methods well known in the art. Briefly, a gel is prepared, then fluid is removed by any suitable method that substantially preserves the gel structure and pore size. The method of fluid removal can be supercritical fluid extraction, evaporation of liquid, or freeze-drying. The gel can be cast in particles to match the desired final aerogel. As examples, particular specific methods of preparing aerogels will now be described. In one technique, silica gels can be prepared by pouring slowly with stirring a sodium silicate ($Na_2SiO_3$) solution of specific density 1.15 in water into an equal volume of 6 M HCl. The solution is allowed to gel in dishes for 24 hours at room temperature, and then washed with water until no chloride ion is found in the wash water. The gel may then be washed with ethanol and then the ethanol removed by heating under pressure to above the critical temperature and then removing the supercritical alcohol. Alternatively, liquid in a gel can be removed with supercritical carbon dioxide. In this process, if necessary, the gel is washed to replace liquid in the gel with a liquid that is miscible with $CO_2$ (e.g., water, dimethylsulfoxide, acetone, methanol, amyl alcohol, etc.). The gel is then washed with $CO_2$ at a temperature and pressure above the critical point, e.g., 37° C. and 82 bar. Slow isothermal depressurization is then used to remove the $CO_2$, e.g., 0.05 bar/min at 37° C.

In another method, a final solution of 0.29 M resorcinol, 0.57 M formaldehyde, and 1.5 mM $Na_2CO_3$ is prepared and sealed into ampules. The sealed ampules are placed in an oven at 85° C. for 7 days. The ampules are then cooled and broken to remove the gel. The gel may be washed with acetone, and the acetone then removed from the gel with evaporation at subcritical temperatures and pressures.

In another method, an organic or inorganic gel having surface ROH groups is treated in the wet state with a surface modifying agent of the formula $R_xMX_y$, where R is an organic group, M is Si or Al, and X is a halogen. See U.S. Pat. No. 5,565,142. An example is trimethylchlorosilane. The surface modifying agent decreases the surface tension of the liquid in the gel, allowing the liquid to be evaporated without shrinking the gel.

Other aerogels and methods to prepare them are described in, e.g., Rigacci, 2004, "Preparation of Polyurethane-Based Aerogels and Xerogels for Thermal Superinsulation," *J. Non-crystalline Solids* 350:372-378; U.S. Pat. No. 5,795,556; U.S. Pat. No. 5,680,713; U.S. Pat. No. 5,306,555; and U.S. Pat. No. 7,074,880.

Aerogels are excellent thermal insulators. They minimize conduction because of the tortuous path through the aerogel nanostructure. They minimize convection because of the small pore sizes. If doped with infrared-suppressing dopants, they may also minimize radiative heat transfer; however aerogels are often very brittle and fragile, which limits their utility in some applications.

Aerogels that are formed by supercritical fluid extraction are usually superior to xerogel aerogels (formed using other methods of liquid removal) in being somewhat better insulators, more lightweight, and having greater surface area. This is because supercritical fluid extraction usually better preserves the gel structure as compared to other methods of liquid removal from gels. But supercritical fluid extraction requires extremes of pressure and/or temperature, and it is easier and less expensive to remove liquid from gels by other means, i.e., to form xerogels. And the properties of xerogels can often be made very close to the properties of aerogels formed by supercritical fluid extraction.

The invention involves composite materials comprising a polymer foam and an aerogel.

In one embodiment, the composite materials, the polymer foam, and the aerogel are all flame resistant.

In a preferred embodiment, the aerogel is a silica aerogel.

In one embodiment, the aerogel is a metal oxide aerogel, e.g., alumina aerogel.

The composite materials are preferably usable at temperature extremes, e.g., at above 200° C. (473 K) or below −196° C. (77 K).

In one embodiment, the polymer foam has a glass transition temperature above 200° C. (473 K).

In another embodiment, the polymer foam has an elastic compression strain at −196° C. (77 K) that is at least 0.05% and is at least half the elastic compression strain at 25° C. (298 K).

The composite materials are good thermal and acoustic insulators. In preferred embodiments, the composite material has a thermal conductivity at least 10% lower than the thermal conductivity of the polymer foam.

The polymer foam of the composite materials can be predominantly closed-cell or open-cell.

In some embodiments, the closed-cell content of the polymer foam is at least 30%, at least 40%, at least 50%, at least 60%, at least 70%, at least 80%, or at least 90%.

In other embodiments, the open-cell content of the polymer foam is at least 30%, at least 40%, at least 50%, at least 60%, at least 70%, at least 80%, or at least 90%.

Closed-cell foams are generally better insulators than open-cell foams. Open-cell foams are generally more compressible. Open-cell foams are also useful in embodiments involving cryogen storage, because cryogen can pass through the open-cell structure to access internal aerogel.

In some embodiments, the polymer foam is made from friable balloons. This involves partial inflation of a solid residuum powder before the final foaming process. Friable balloons facilitate an increase in closed-cell content, particularly at low densities. At higher densities, the friable balloons are crushed and break, the closed-cell content of the foam decreases. Maximum closed-cell content with foam prepared from TEEK H friable balloons is about 80% and occurs at a density of about 0.045 g/cm³ see foams prepared as described in Williams, M. K. et al. 2005, "Effects of cell structure and density on the properties of high performance polyimide foams," *Polymers for Advanced Technologies* 16:167-174, incorporated by reference. The maximum closed-cell content of TEEK-H can be increased above that level if balloons are sifted to remove very small particles that are common in the as-formed balloons. A high closed-cell content at higher densities can also be achieved by first forming smaller balloons by the use of less solvent so the balloons do not expand as much.

The polymer of the polymer foam can be any suitable polymer. In some embodiments, it is a polyimide. In a more specific embodiment, it is a heteroaromatic polyimide.

In a more specific embodiment, the heteroaromatic polyimide polymer of the polymer foam is a polymer of formula (I):

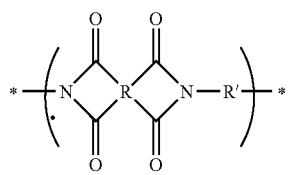

I wherein R is a tetravalent aromatic radical having 1 to 5 benzenoid-unsaturated rings of 6 carbon atoms, the 4 carbonyl groups being directly bonded to different carbon atoms in a benzene ring of the R radical, each pair of carbonyl groups being bonded to adjacent carbon atoms in the benzene ring of the R radical; and R' is a divalent aromatic radical having 1 to 5 benzenoid-unsaturated rings of 6 carbon atoms, the amino groups being directly bonded to different carbon atoms in a benzene ring of the R' radical.

In a more specific embodiment of the composite materials, the polymer of the polymer foam is a polymer of formula (II) or (III)

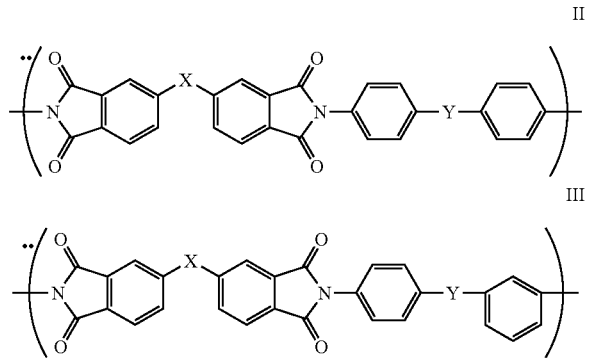

wherein X is —O— or —C(=O)— and Y is —O— or —SO₂—.

In a preferred embodiment, the polymer is a polymer of formula III wherein X is —O— and Y is —O—. This is known as TEEK H and is used in the Examples below.

Foams of formula I, II, and III and their methods of preparation are described further in U.S. Pat. Nos. 5,994,418; 6,084,000; 6,133,330; 6,180,746; 6,222,007; and 6,235,803 incorporated herein by reference.

TEEK is very flame resistant. The TEEK H polymer foam made from friable balloons has a peak heat release rate (PHRR) of approximately 24 kW/m² at an irradiance of 50 kW/m². TEEK H foam made from solid residuum has a PHRR slightly higher but still less than 60 kW/m² at the same irradiance level.

In specific embodiments of the composite materials of the invention, the polymer foam has a PHRR at an irradiance of 50 kW/m² of less than 100 kW/m², less than 60 kW/m², less than 50 kW/m², or less than 30 kW/m². In other embodiments, the polymer foam has a PHRR at an irradiance of 50 kW/m² of 10-100, 20-100, 10-60, or 20-60 kW/m².

The polymer foam contains the aerogel in the composite materials. As used herein, the term "contains" means that the polymer foam restricts motion of the aerogel from all sides of the aerogel or all sides except one.

Preferably, the polymer foam holds the aerogel immobile relative to the foam by direct contact with the aerogel or by exerting pressure against the aerogel through an intervening material, e.g., a vapor barrier.

In one embodiment, the polymer foam directly contacts the aerogel.

In a particular embodiment, the composite material is prepared by foaming the polymer in a space with the aerogel to expand the polymer foam against the aerogel. The polymer foam may expand directly against the aerogel, i.e., to make direct contact with the aerogel, or may expand against an intervening material between the foam and the aerogel, to make an indirect association with the aerogel through the intervening material and exert pressure against the aerogel.

Creating a composite material where the foam exerts pressure against the aerogel and holds the aerogel immobile relative to the foam can occur by foaming the polymer in a space with the aerogel, or by forming the composite material by associating preformed foam with the aerogel.

In particular embodiments, the composite material is a uniform blend of the polymer foam and aerogel particles of 1 cm diameter or less. In other embodiments, it is a uniform blend of the polymer foam and aerogel particles of 1 mm diameter or less.

In particular embodiments, the composite material comprises two or more layers of the polymer foam containing one or more layers of aerogel. The one or more layers of aerogel may be an aerogel blanket. An aerogel blanket involves aerogel held together by fibers. SPACELOFT is an aerogel blanket available from Aspen Aerogel. In another embodiment, the one or more layers of aerogel are aerogel particles.

In the embodiments of composite material comprising two or more layers of the polymer foam containing one or more layers of aerogel, the two or more layers of polymer foam may further comprise aerogel particles dispersed therein, i.e., the foam layers may be a uniform blend of the polymer foam and aerogel particles of 1 cm diameter or less.

The composite materials may be used for storage of a cryogen, so in one embodiment, the composite material further comprises a cryogen adsorbed to the aerogel. As used herein, the term "cryogen" refers to a substance that is a gas at room temperature and has a boiling point at atmospheric pressure of about −143° C. (130 K) or below.

One embodiment of the invention provides a composite material comprising a polyimide foam containing an aerogel. The polyimide foam may be pure polyimide or a polyimide copolymer.

One embodiment of the invention provides a cryogen storage apparatus comprising: (a) a composite material comprising: (i) a polymer foam; containing and holding immobile relative to the polymer foam and (ii) an aerogel. The polymer foam forms one or more openings through the foam that allow fluid access to the aerogel; and the aerogel provides a storage medium for a cryogen.

If the polymer foam is open-cell, cryogen can pass through the foam to access the aerogel, and the polymer foam can completely enclose the aerogel. If the polymer foam is substantially closed-cell, the foam may enclose the aerogel and prevent cryogen access to the aerogel. If that is the case, one or more macroscopic holes or passageways through the foam can be provided to allow cryogen access to the aerogel. Sealing the cryogen, such as with a closed-cell foam, can be useful to slow and control cryogen loss from the aerogel. The same can be accomplished with a vapor barrier that is separate from the polymer foam. For instance a vapor barrier, e.g., a thin plastic sheet, can be placed between the foam and the aerogel in the composite material, or surrounding the composite material. To allow addition or release of cryogen from the aerogel, the vapor barrier has to have one or more openings. If no release is desired, a vapor barrier outside of the composite material can be added after loading cryogen on the composite material to completely enclose the composite material.

Because of greater access of fluid to the cryogen when the composite materials contain open-cell foams instead of closed-cell foams, the composites with open-cell foams often have a higher storage capacity for cryogen. Composites with closed-cell foams can equal the storage capacity of composites with open-cell foams if the architecture allows complete access of cryogen to the aerogel, which can be accomplished for instance, with macroscopic holes or passageways through the closed-cell foam to a layer of an aerogel blanket.

The cryogen storage capacity of the composites can also be increased by the use of lower-density aerogels than, for instance, Cabot NANOGEL. Lower-density aerogels have more space for cryogen storage.

An advantage of this cryogen storage apparatus is that the cryogen is nanosequestered in the aerogel, eliminating slosh of liquid cryogen. Another advantage is that if the apparatus is impacted, such as with shrapnel from a vehicle accident if the apparatus is a hydrogen or methane fuel tank, or with a micro-meteor impact if the apparatus is used in space travel, the foam may be torn, but would be expected to still maintain some structure. It thus would still hold the aerogel together and provide some insulation to the aerogel and cryogen stored in the aerogel, thereby preventing explosive release or rapid boil off of the cryogen, which could be hazardous, especially if the cryogen stored is a fuel such as hydrogen or methane.

In one embodiment of the cryogen storage apparatus, the polymer foam is at least 30% open-cell and the open cells of the foam provide the openings through the foam that allow fluid access to the cryogen.

In other embodiments, the polymer foam is at least 50% open-cell or at least 90% open-cell.

In another embodiment, the polymer foam forms macroscopic holes that are the openings through the foam that allow fluid access to the aerogel.

In one embodiment, the polymer foam forms a single macroscopic passageway that is the opening through the foam that allows fluid access to the aerogel.

In one embodiment, the aerogel is particles of less than 1 cm or less than 1 mm diameter dispersed in the polymer foam.

In one embodiment, the polymer foam and the apparatus are flame resistant.

In one embodiment of the cryogen storage apparatus, the polymer foam holds the aerogel immobile relative to the polymer foam by direct contact with the aerogel.

In another embodiment, the composite material further comprises an intervening material between the polymer foam and the aerogel and the polymer foam holds the aerogel immobile relative to the polymer foam by exerting pressure against the aerogel through the intervening material. The intervening material may be, for instance, a vapor barrier. A vapor barrier will slow and control loss of cryogen (boil off) from the aerogel. But a vapor barrier will have to have at least one opening to allow access of the cryogen to the aerogel for storage.

In another embodiment, the cryogen storage apparatus further comprises a vapor barrier partially or fully enclosing the composite material. If the vapor barrier fully encloses the composite material and removal of the cryogen from the apparatus is desired, the vapor barrier must be removable or openable to allow removing cryogen from the composite material.

In one embodiment, the apparatus is adapted to store a cryogen in the aerogel to cool a space surrounding the apparatus. In a more specific embodiment of this cooling apparatus, the apparatus is adapted to release stored cryogen at a controlled rate.

The composite material with open-cell foam may be encapsulated by a shrink wrap gas-impermeable material that is perforated with small holes. This structure can help to allow slow release of the cryogen at a controlled rate. The holes in the vapor barrier can be any size. In one embodiment they are smaller than the pores of the open-cell foam of the composite.

The polymer foam of composite materials of the cryogen storage apparatus may be any suitable polymer. In one embodiment, it is a polysiloxane, a polyurethane, or a polyimide. In one embodiment, it is a polyolefin, a polystyrene, a polyester, a polyamide, a polyether, a polyurethane, an acrylic polymer, a polyimide, a polyurea, a vinyl polymer, a polysiloxane, a polysulfide, a polycarbonate, a liquid crystal polymer, or a copolymer or mixture thereof.

Refrigerated shipping containers and boxes typically use styrofoam boxes inside cardboard boxes to ship everything from foods to flowers to biological specimens to pharmaceuticals. Many of the shipped items, including pharmaceuticals, are very expensive. Some materials require very narrow bands of temperature for more than 24 hours. The refrigerant used in current shipping is typically dry ice. Problems with these packages can include 1) non-uniform temperatures, 2) an inability to achieve the desired temperature with dry ice, and 3) too short a duration of the cold temperature, i.e., too much dry ice may be needed to keep it from completely subliming during transit. The composites can provide improved solutions to these problems. Shipping containers/boxes can be designed to take advantage of the more uniform and gradual dissipation of the refrigeration provided by the new composite when loaded with a cryogen such as liquid nitrogen.

The invention also provides articles of manufacture comprising a composite material of the invention.

In specific embodiments, the article is adapted for use at temperatures below −195° C. (78 K).

In specific embodiments, the article is adapted for use at temperatures above 200° C. (473 K).

In specific embodiments, the article is adapted for use at temperatures below −195° C. (78 K) and at temperatures above 200° C. (473 K).

In a particular embodiment, the article is a storage vessel for a cryogen adsorbed to the aerogel.

In other specific embodiments, the article is a structural member of a building, machine, or aerospace or maritime vessel.

In other specific embodiments, the article is an insulation panel of a building, machine, or aerospace or maritime vessel.

Another embodiment of the invention provides a method of insulating a location from sound involving interposing between the location and a source of sound a composite material of the invention.

The invention will now be illustrated with the following examples. The examples are intended to illustrate the invention but not limit its scope.

EXAMPLES

TEEK polyimide foams can be prepared as described in U.S. Pat. Nos. 6,133,330 and 6,180,746. This example uses TEEK H.

Friable Balloon Fabrication.

A salt-like foam precursor is synthesized by mixing monomer reactants of a diamine with a foaming agent (tetrahydrofuran) in methanol at room temperature. The diamine (3,4'-oxydianiline (ODA), 227 g—1.1 moles) is dispersed in a mixture of tetrahydrofuran (THF—1120 g) and 280 g of methanol (MeOH) at room temperature. The mixture is stirred. To the stirring 3,4'-ODA solution, a dianhydride (e.g. 4,4'-oxydiphthalic anhydride (ODPA), 176 g—0.57 moles) is added gradually at 15° C. to yield a homogenous solution. Solid contents and viscosity of the resulting solution and 30% (w/w) and 0.2 poise, respectively. The solution is then charged into a stainless-steel vat and treated at 70° C. for 14 hours in order to evaporate the solvent (THF and MeOH). The resulting material is cooled and crushed into a fine powder (2 to 500 microns). The polyimide precursor solid residuum is then treated for an additional amount of time (0 to 300 minutes) at 80° C. to further reduce the residual solvent to about 1-10% (w/w) depending on the final foam density desired. Residual amounts of THF are determined by measuring proton NMR spectra of the powders. The polyimide precursor powders are further treated at 100° C. to expand the powders without thermal imidization so that the apparent density of the precursor is decreased without thermal imidization and friable balloons resulted.

Friable Balloon Foaming Process.

The process of foaming the friable balloons into a solid neat piece of foam or foam filled with honeycomb was accomplished by closed-mold foaming technique. The mold may optionally contain a piece of honeycomb core. The top and bottom of the mold were graphite plates. In order to obtain a specific density of foam, a back calculation is utilized. The desired density was multiplied by the mold volume and a specific weight is obtained. To this weight an additional 20% is added to account for solvent removal and water formation during precursor imidization. Two metal heat plates are placed in contact with the top and bottom surfaces of the mold.

A cure cycle in a convection oven is used to fully imidize the friable balloons and form a well-consolidated piece of foam. The mold containing friable balloons is placed in the oven with the metal heating plates above and below the mold. The mold is restrained with weight on the top surface provided by the top metal heating plate. The oven temperature is raised to 250° C. from room temperature and then held for 1 hour. Then the temperature is raised again to 300° C. and held for 1 hour more. Then the oven is cooled to room temperature and the mold is removed.

Closed-Cell Content Testing.

Closed-cell content was measured according to ASTM D-6226 utilizing a Quantachrome UltraFoam 1000. Closed-cell measurements are determined by obtaining the open-cell content from Boyle's Law. Boyle's Law states that the volume of a gas at constant temperature is inversely proportional to its pressure ($V=1/P$). Therefore, if a known volume is pressurized in a contained chamber, the decrease in pressure can be correlated to the actual volume and simple mathematics allows the open-cell content to be determined. The closed-cell content equals 1 minus open-cell content.

Example 1

TEEK Foam-Aerogel Bead Composite

Seven grams of NANOGEL aerogel beads (Cabot Corporation) (nominal 1 mm beads) and 28 grams of TEEK friable balloons were placed into a container and shaken continuously for 1 minute until a homogenous mixture was obtained. The entire contents of the container, 35 grams of the mixture containing 20% aerogel beads and 80% TEEK friable balloons, were transferred to a 0.1524 meter by 0.1524 meter by 0.0318 meter stainless steel mold and covered with a porous graphite plate. The mold was then placed in a convection oven and the temperature was raised to 200° C. and held for 2 hours. Once done, the temperature was reduced to ambient and the mold was removed from the oven. The resultant foam composite weighed 30.56 grams with a density of 0.04138 $g/cm^3$.

Example 2

TEEK with Aerogel Blanket Layer

A single piece of SPACELOFT aerogel blanket (Aspen Aerogel) (6 mm thick) was cut into a 0.1016 meter square. Thirty grams of TEEK friable balloons were weighed out. Fifteen grams of the TEEK friable balloons were poured into the bottom of a 0.1524 meter by 0.1524 meter by 0.0318 meter stainless steel mold and was shaken to disburse the balloons evenly across the mold surface. The aerogel blanket was then placed in the center of the mold and the remaining 15 grams of TEEK friable balloons were poured over the blanket. A porous graphite plate was placed over the mold and then the entire mold assembly was placed into a convection oven. The temperature was raised to 200° C. and held for 2 hours. Once done, the temperature was reduced to ambient and the mold was removed from the oven. The resultant foam composite weighed 30.41 grams with a density of 0.0412 $g/cm^3$.

Example 3

TEEK with Diagonal Strips of Aerogel Blanket

SPACELOFT aerogel blanket was cut into strips 14 cm by 3 cm and inserted into a mold between layers of TEEK friable balloons at a 45 degree angle in a square mold as in Example 2. The strips of SPACELOFT were evenly spaced with some space between strips.

Example 4

TEEK Foam-Aerogel Bead PITA 14.54 grams of TEEK friable balloons were poured into a 0.1524 meter by 0.1524 meter by 0.0318 stainless steel mold to form the bottom layer. A structure was then inserted to keep aerogel filler away from the edge of the mold. The structure in one case is a square-shaped mold and another case is a mold with 4.76-mm diameter hexagonal internal chambers (honeycomb reinforcement). The structure was composed of aluminum. 6.05 grams of NANOGEL were poured into the structure to form a middle aerogel layer. The square mold structure was then removed; the honeycomb reinforcement when used was not removed and became part of the composite material. 14.53 grams of TEEK friable balloons are then poured around the edges and on top to form the top layer. The mold was then placed in a convection oven with a porous graphite top to allow solvent release, at a temperature of 250° C. for 1 hour and then 300° C. for 1 more hour.

Comparative Example 5

TEEK Foam

Thirty-five grams of TEEK friable balloons were transferred to a 0.1524 meter by 0.1524 meter by 0.0318 meter stainless steel mold and covered with a porous graphite plate. The mold was then placed in a convection oven and the temperature was raised to 200° C. and held for 2 hours. Once done, the temperature was reduced to ambient and the mold was removed from the oven. The resultant foam composite weighed 30.23 grams with a density of 0.0409 $g/cm^3$.

Example 6

Thermal Conductivity and Density of the Composite Materials

Thermal conductivity of the samples was measured with a Netzsch NANOFLASH (Netzsch Instruments, Inc., Burlington, Mass.). The aerogel materials have a higher density in general than the foam, so a higher aerogel content tends to produce a higher density of the materials. But the density of the foam component can be modified to adjust the density of the composite material.

Table 1 shows density and thermal conductivity and thermal resistance of several samples.

TABLE 1

| Sample - Description | Density (kg/m$^3$) | Thermal Conductivity (k) (mW/m·K) | Thermal Resistance (ft$^2$·°F·h/Btu) |
|---|---|---|---|
| BX-265, A0 (Baseline) | 36.923 | 18.59 | 7.81809 |
| LARC-N1 (TEEK-aerogel homogeneous composite containing 10% aerogel beads) | 40.733 | 31.716 | 5.63038 |
| LARC-N2 (TEEK-aerogel homogeneous composite containing 20% aerogel beads.) | 41.377 | 30.972 | 5.77795 |
| LARC-N3 (Single layer aerogel blanket in TEEK) | 41.173 | 25.908 | 7.00954 |
| LARC-N4 (Single layer aerogel blanket in TEEK) | 44.059 | 25.52 | 7.08582 |
| LARC-N5 (Double layer aerogel blanket in TEEK) | 48.284 | 21.803 | 8.33115 |
| LARC-N6 (Diagonal strips of aerogel blanket in TEEK) | 40.68 | 31.019 | 5.87709 |
| LARC-N7 (Horizontal strips of aerogel blanket in TEEK) | 40.793 | 29.91 | 6.00441 |
| LARC-N8 (Vertical strips of aerogel blanket in TEEK) | 40.566 | 31.559 | 5.72727 |
| TEEK-aerogel homogeneous composite (10% aerogel beads) | 41.672 | 32.217 | 5.637 |
| TEEK-aerogel homogeneous composite (20% aerogel beads) | 46.256 | 30.822 | 5.886 |
| TEEK 100% | 40.924 | 33.234 | 5.480883 |

Table 1 illustrates the significant decrease in thermal conductivity (increase in thermal resistance and better thermal insulation) of the composite materials compared to 100% TEEK foam. In Table 1, a rigid closed-cell polyurethane foam, STEPANFOAM BX-265, is included as a standard reference. The BX-265 displays good thermal insulation ability, but it degrades chemically and mechanically with time. The BX-265 does not have good acoustical properties and has limited upper temperature usage.

Table 2 includes reference thermal conductivity data for the fillers—aerogel beads and blankets—as well as TEEK and composites. As shown in Table 1, the composites have significantly lower thermal conductivity than the base foam. The base aerogel materials have lower thermal conductivity, but TEEK adds significant structural properties.

TABLE 2

| Material | Density (kg/m$^3$) | Thermal Conductivity (k) (mW/m·K) | Thermal Resistance (ft$^2$·°F·h/Btu) |
|---|---|---|---|
| Cabot Aerogel Beads | 90 | 18 | 6.475 |
| Aspen Aerogel SPACELOFT Composite Blanket, One layer | 94.39 | 13.82 | 10.434 |
| Aspen Aerogel SPACELOFT, 2 layers | 94.39 | 13.76 | 10.48 |
| TEEK 100% | 39.49 | 33.537 | 4.3 |
| PITA sandwich composite with layer of aerogel beads in TEEK (18% aerogel content) | 69.23 | 23.497 | 6.137 |
| PITA sandwich composite with double layer of aerogel (TEEK-aerogel-TEEK-aerogel-TEEK) (22% total aerogel content) | 77.04 | 29.833 | 4.816 |
| TEEK 18% Aerogel homogeneous composite | 67.09 | 29.301 | 4.932 |
| TEEK 16% Aerogel homogeneous composite | 77.8 | 29.973 | 4.837 |
| TEEK 100% | 69.81 | 34.51 | 4.234 |

The thermal conductivity and density of TEEK-aerogel PITA composites prepared with and without a honeycomb to separate aerogel into compartments are shown in Table 3. BX-250 is a polyurethane foam included for comparison.

TABLE 3

Thermal conductivity and density of PITA-type TEEK composites.

| Material | PITA type | Density (g/cm3) | Aerogel content w/w (%) | Thermal conductivity (k) (mW/m-K) |
|---|---|---|---|---|
| TEEK-1-42 | single | 0.0671 | 18.0 | 29.3010 |
| TEEK-1-40 | double | 0.0770 | 22.0 | 29.8330 |
| TEEK-1-43 | single | 0.778 | 17.0 | 29.9730 |
| TEEK-1-36 | single-honeycomb | 0.1092 | 11.0 | 38.4951 |
| TEEK-1-37 | single-honeycomb | 0.1339 | 18.5 | 38.6690 |

TABLE 3-continued

Thermal conductivity and density of PITA-type TEEK composites.

| Material | PITA type | Density (g/cm3) | Aerogel content w/w (%) | Thermal conductivity (k) (mW/m-K) |
|---|---|---|---|---|
| TEEK-1-39 | single-honeycomb | 0.0583 | 13.0 | 39.074 |
| BX-250 | N/A | 0.0241 | 0.0 | 18.97 |

The data show that the PITAs with the honeycomb reinforcement have higher thermal conductivity (lower thermal resistance and less thermal insulation ability) than PITAs prepared without the honeycomb reinforcement.

Thermal conductivity and density of composite samples that are a homogeneous mixture of TEEK and aerogel, aerogel beads in a PITA style pocket in TEEK, or a TEEK-aerogel blanket sandwich composite are shown in Table 4. The density of the foams varies between different samples.

TABLE 4

Polyimide foam composite thermal conductivity and density data.

| Material | Density lb/ft³ | Thermal Conductivity (k) mW/m-K |
|---|---|---|
| TEEK control | 2.49 | 32.98 |
| TEEK control | 2.55 | 33.23 |
| TEEK control | 6.11 | 36.10 |
| TEEK control | 2.54 | 32.38 |
| TEEK control | 1.76 | 31.24 |
| TEEK 10% aerogel w/w | 2.60 | 32.22 |
| TEEK 10% aerogel w/w | 6.03 | 33.76 |
| TEEK 10% aerogel w/w | 2.33 | 31.97 |
| TEEK 20% aerogel w/w | 2.89 | 30.82 |
| TEEK 20% aerogel w/w | 6.18 | 31.32 |
| TEEK 20% aerogel w/w | 2.38 | 30.82 |
| TEEK 25% aerogel w/w | 2.97 | 30.17 |
| TEEK 25% aerogel w/w | 5.98 | 29.69 |
| TEEK 25% aerogel w/w | 2.43 | 30.63 |
| TEEK 30% aerogel w/w | 2.99 | 29.48 |
| TEEK 30% aerogel w/w | 2.45 | 29.85 |
| TEEK 40% aerogel w/w | 3.38 | 28.09 |
| TEEK 40% aerogel w/w | 2.52 | 29.20 |
| TEEK PITA with pocket of aerogel beads | 2.91 | 26.48 |
| TEEK aerogel blanket 1 layer | 6.17 | 26.18 |
| TEEK aerogel blanket 2 layer | 6.12 | 21.04 |
| TEEK aerogel blanket diagonal strips (9) | 5.99 | 33.20 |
| Aerogel blanket 1 layer in TEEK-10% aerogel homogeneous composite. | 2.88 | 24.83 |
| Aerogel blanket 1 layer in TEEK-30% aerogel homogeneous composite. | 3.45 | 24.22 |
| Aerogel blanket diagonal strips (9) in TEEK-30% aerogel homogeneous composite. | 2.34 | 27.00 |

The density of the TEEK in the composite materials of Table 4 varied. This is shown, and the effect of the variance is shown, graphically in FIG. 1. FIG. 1 shows that as more aerogel is included in the composite, the k-value decreases. Concentrating the aerogel in one area in the PITA configuration or with an aerogel blanket sandwiched between layers of TEEK decreases the thermal conductivity more than dispersing aerogel particles homogeneously in the foam. The composite with two layers of aerogel blanket had the lowest k-value. In the composites with two layers of aerogel blanket, the two layers of aerogel blanket are separated by an additional layer of TEEK (i.e., the structure is TEEK-aerogel-TEEK-aerogel-TEEK). The overall dimensions remain the same.

Figure 2:
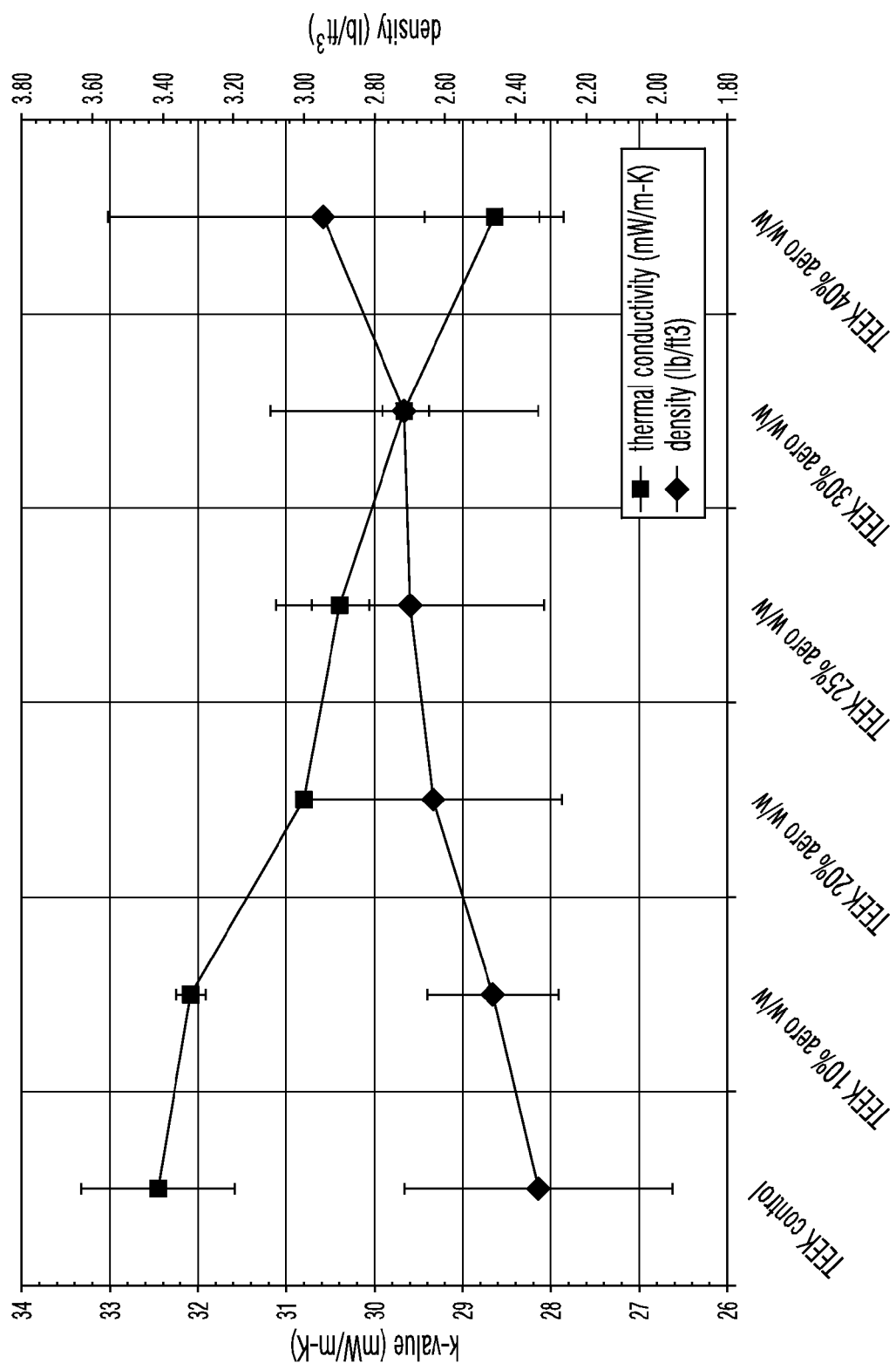
FIG. 2 is a plot of averaged thermal conductivity and density measurements of TEEK and TEEK/aerogel composite foam materials.

FIG. 2 shows the averaged thermal conductivity and density of homogeneous composites with 0-40% (w/w) aerogel beads. The figure shows the clear trends that the higher the aerogel content, the higher the density the composite materials tends to be and the lower the thermal conductivity (k-value).

Figure 3:
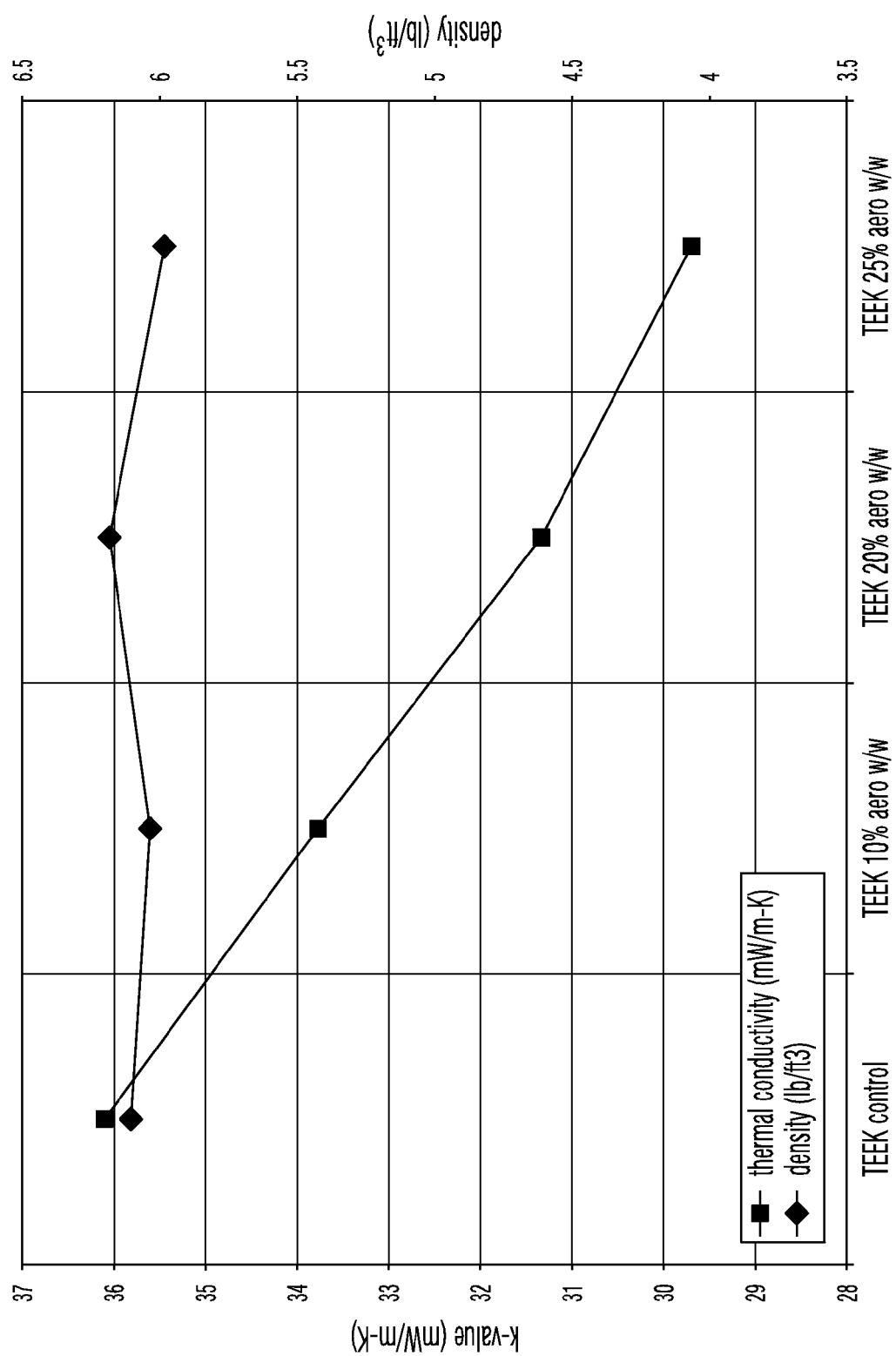
FIG. 3 is a plot of thermal conductivity and density measurements of TEEK and TEEK/aerogel composite foam materials having approximately the same density.

The density of TEEK foam can be modulated, so that the density of the composite materials is kept constant as aerogel is added. A comparison of samples with 0-25% aerogel but with a constant density near 6 lbs/ft³ is shown in FIG. 3. In this figure, the composite with 25% aerogel has a thermal conductivity approximately 18% lower than the pure TEEK foam.

Example 7

Cryogen Storage in Foam-Aerogel Composites

Cryogenic liquids such as liquid nitrogen adsorb to the surfaces in aerogel and also, to a lesser extent, to the surfaces of foam. Aerogel beads and blankets were soaked in liquid nitrogen, then bulk liquid was drained and the materials were placed on a balance to monitor weight loss as adsorbed nitrogen in the materials desorbs and diffuses out. Seventy-eight grams of NANOGEL aerogel beads adsorbed approximately 370 grams $N_2$. Forty-one grams of SPACELOFT aerogel blanket adsorbed approximately 145 grams $N_2$. So aerogel can adsorb many times its own weight of a cryogen.

Figure 4A:
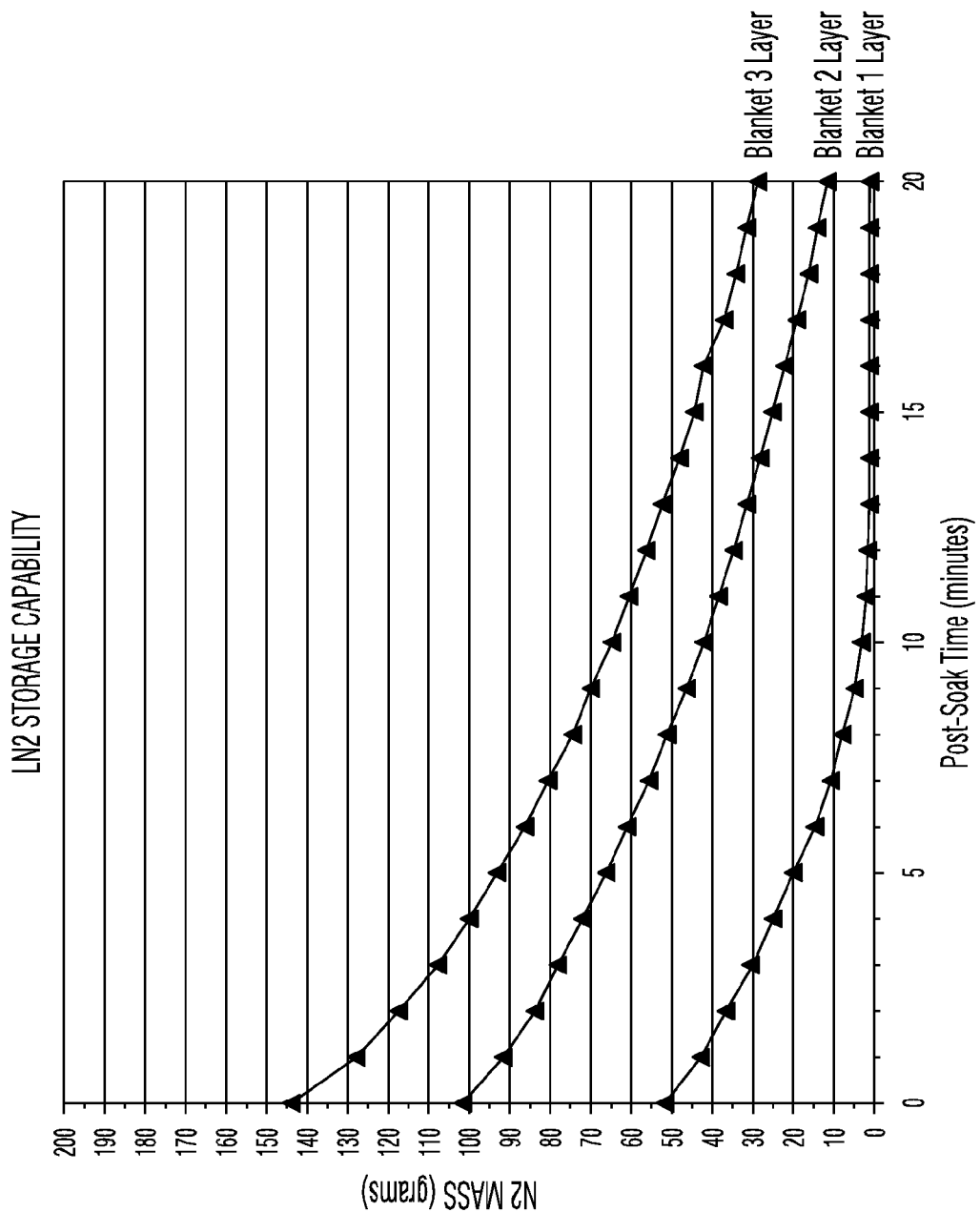
FIG. 4A is a plot of liquid nitrogen storage versus time in a composite material containing an aerogel blanket within a TEEK foam.
Figure 4B:
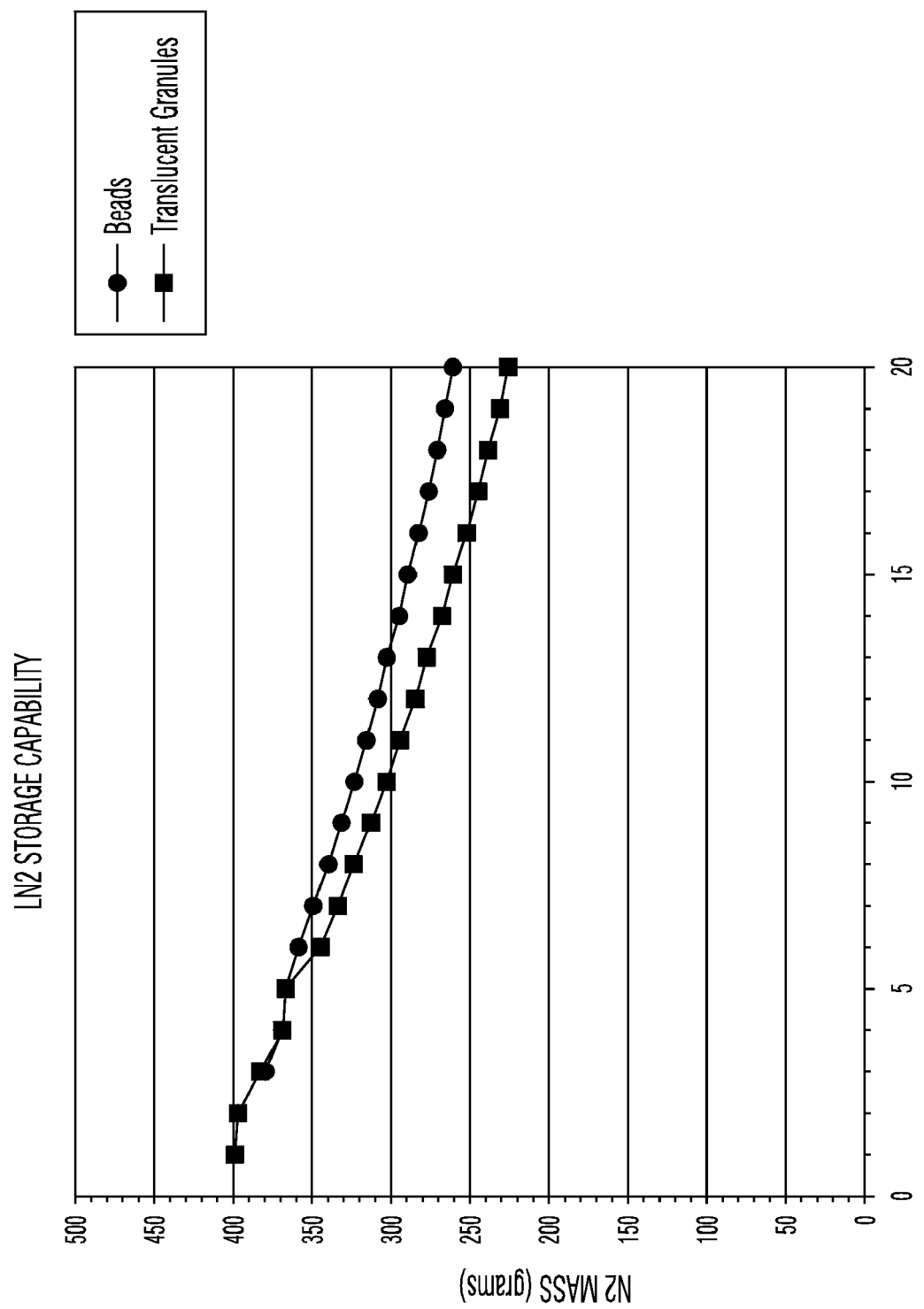
FIG. 4B is a plot of liquid nitrogen storage versus time in a composite material containing aerogel beads in a pocket within a TEEK foam.

The boil-off rate of adsorbed $N_2$ from aerogel blanket and beads is shown in FIGS. 4A and 4B, respectively.

Liquid $N_2$ can also adsorb to some extent to TEEK foam. Storage of liquid $N_2$ in five TEEK foam samples prepared from friable balloons is shown in Table 5.

TABLE 5

Liquid $N_2$ storage in TEEK foams.

| Sample | N109 | N110 | N115 | N116 | N136 |
|---|---|---|---|---|---|
| material | TEEK control | TEEK control | TEEK control | TEEK control | TEEK control |
| density (lb/ft3) | 2.49 | 2.55 | 6.11 | 2.54 | 1.76 |
| k-value (mW/m-K) | 32.98 | 33.23 | 36.10 | 32.38 | 31.24 |
| Cryo-Storage (min) | LN2 (g) | LN2 (g) | LN2 (g) | LN2 (g) | LN2 (g) |
| 0 | 42.176 | 13.430 | 0.188 | 50.369 | 49.864 |
| 1 | 32.327 | 10.311 | 0.187 | 41.597 | 38.930 |
| 2 | 27.576 | 8.222 | 0.199 | 34.865 | 30.159 |

TABLE 5-continued

Liquid N$_2$ storage in TEEK foams.

| Sample | N109 | N110 | N115 | N116 | N136 |
|---|---|---|---|---|---|
| 3 | 23.327 | 5.451 | 0.204 | 29.736 | 24.177 |
| 4 | 19.801 | 4.922 | 0.204 | 25.381 | 19.517 |
| 5 | 16.831 | 3.681 | 0.198 | 21.680 | 15.665 |
| 6 | 14.184 | 2.697 | 0.190 | 18.453 | 12.364 |
| 7 | 11.859 | 1.958 | 0.179 | 15.627 | 9.668 |
| 8 | 9.826 | 1.310 | 0.167 | 13.118 | 7.430 |
| 9 | 7.990 | 0.917 | 0.154 | 10.952 | 5.684 |
| 10 | 6.366 | 0.613 | 0.141 | 9.024 | 4.305 |
| 11 | 4.996 | 0.418 | 0.129 | 7.361 | 3.234 |
| 12 | 3.796 | 0.311 | 0.116 | 5.896 | 2.369 |
| 13 | 2.826 | 0.281 | 0.105 | 4.683 | 1.698 |
| 14 | 2.022 | 0.263 | 0.096 | 3.636 | 1.204 |
| 15 | 1.288 | 0.250 | 0.087 | 2.790 | 0.830 |
| 16 | 0.760 | 0.239 | 0.080 | 2.052 | 0.620 |
| 17 | 0.327 | 0.226 | 0.073 | 1.485 | 0.544 |
| 18 | 0.032 | 0.217 | 0.067 | 1.064 | 0.513 |
| 19 | −0.158 | 0.207 | 0.061 | 0.728 | 0.489 |
| 20 | −0.227 | 0.197 | 0.056 | 0.529 | 0.468 |

Table 5 shows that cryogen adsorption to the TEEK foams varied between samples. This is due to the closed-cell content of the foam and other structural traits of the foams. A 100% closed-cell foam would not be expected to absorb cryogen because the cryogen would not have access to the interior of the foam. The highest density foam sample tested, N115, in Table 5 absorbed almost no N$_2$. N110 also absorbed less than the others. The other foams absorbed approximately 1.4 times their weight in N$_2$.

The TEEK foam-aerogel composite materials also adsorb N$_2$. Adsorption of N$_2$ and boil-off of the N$_2$ in some TEEK foam-aerogel composite materials is shown in Table 6.

In Table 6, N111 and N130 are TEEK foam-aerogel particle homogeneous mixtures. N134 is a sandwich of 30% aerogel homogeneous TEEK foam-aerogel sandwiched around an aerogel blanket. N117 is a sandwich with 100% TEEK foam surrounding an aerogel blanket. Each of these samples is a 6 inch×6 inch×1.25 inch (0.1524 meter by 0.1524 meter by 0.0318 meter) block. N134 and N117 have a 5×5 inch×6 mm (127 mm×127 mm×6 mm) aerogel blanket in the center of the block.

The composite samples N111, N130, and N134 adsorbed substantially more N2 than pure TEEK foams do, due to adsorption of the cryogen in pores of the aerogel. N117 is a sample with higher-density foam, and like the high-density

TABLE 6

Liquid N$_2$ storage in TEEK foam-aerogel composites.

| Sample | N111 | N130 | N134 | N117 |
|---|---|---|---|---|
| material | TEEK 30% aerogel w/w | TEEK 30% aero w/w | TEEK 30% aero aeroblanket 1 layer | TEEK aeroblanket 1 layer |
| density (lb/ft3) | 2.99 | 2.45 | 3.45 | 6.17 |
| k-value (mW/m-K) | 29.48 | 29.85 | 24.22 | 26.18 |
| Cryo-Storage (min) | LN2 (g) | LN2 (g) | LN2 (g) | LN2 (g) |
| 0 | 86.567 | 88.335 | 140.862 | 0.431 |
| 1 | 73.262 | 78.470 | 124.802 | 0.139 |
| 2 | 65.465 | 70.778 | 115.403 | 0.140 |
| 3 | 59.735 | 64.511 | 108.132 | 0.135 |
| 4 | 54.220 | 59.142 | 102.107 | 0.123 |
| 5 | 49.862 | 54.365 | 97.009 | 0.110 |
| 6 | 45.965 | 50.025 | 92.459 | 0.094 |
| 7 | 42.591 | 46.010 | 88.325 | 0.076 |
| 8 | 39.555 | 42.323 | 84.518 | 0.065 |
| 9 | 36.782 | 38.880 | 81.062 | 0.054 |
| 10 | 34.283 | 35.763 | 77.722 | 0.047 |
| 11 | 31.934 | 32.835 | 74.742 | 0.039 |
| 12 | 29.652 | 30.097 | 71.828 | 0.033 |
| 13 | 27.650 | 27.582 | 69.107 | 0.027 |
| 14 | 25.834 | 25.242 | 66.542 | 0.022 |
| 15 | 23.992 | 23.006 | 64.041 | 0.016 |
| 16 | 22.215 | 20.951 | 61.693 | 0.012 |
| 17 | 20.604 | 19.041 | 59.490 | 0.009 |
| 18 | 19.084 | 17.249 | 57.382 | 0.005 |
| 19 | 17.724 | 15.567 | 55.344 | 0.001 |
| 20 | 16.292 | 13.992 | 53.410 | −0.002 | foam sample N115 in Table 5, it adsorbed almost no cryogen. In this case the foam structure appears to seal the aerogel and prevent the flow of cryogen into and out of the aerogel. The other foam-aerogel composite samples of Table 6 also adsorbed substantially less nitrogen than they would have if 100% of their volume were occupied by adsorbed nitrogen. This indicates that the foam structure of these as well seals a significant fraction of the aerogel from cryogen. The foams in these composite were TEEK foams prepared from friable balloons. These have a closed-cell content of about 30-80%. A more open-cell foam is expected to allow greater access of cryogen to the aerogel and thereby allow storage of more cryogen.

Although specific embodiments of the present invention have been illustrated and described in this specification, it will be appreciated by those of ordinary skill in the art that any arrangement that is calculated to achieve the same purpose may be substituted for the embodiments shown. This application is intended to cover adaptations or variations of the present invention that come within the scope of this disclosure.

All patents, patent documents, and other references cited are incorporated herein by reference.

We claim:

1. A flame resistant composite material comprising:
   a flame resistant polymer foam; containing
   a flame resistant aerogel;
   wherein the polymer of the polymer foam is flame resistant;
   wherein the polymer foam is made from friable balloons.

2. A flame resistant composite material comprising:
   a flame resistant polymer foam; containing
   a flame resistant aerogel;
   wherein the polymer foam is composed of a heteroaromatic polyimide;
   wherein the polymer of the polymer foam is a polymer of formula (I):

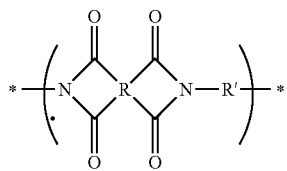

I wherein R is a tetravalent aromatic radical having 1 to 5 benzenoid-unsaturated rings of 6 carbon atoms, the four carbonyl groups being directly bonded to different carbon atoms in a benzene ring of the R radical, each pair of carbonyl groups being bonded to adjacent carbon atoms in the benzene ring of the R radical; and R' is a divalent aromatic radical having 1 to 5 benzenoid-unsaturated rings of 6 carbon atoms, the amino groups being directly bonded to different carbon atoms in a benzene ring of the R' radical.

3. A flame resistant composite material comprising:
   a flame resistant polymer foam; containing
   a flame resistant aerogel;
   wherein the polymer of the polymer foam is a polymer of formula (II) or (III)

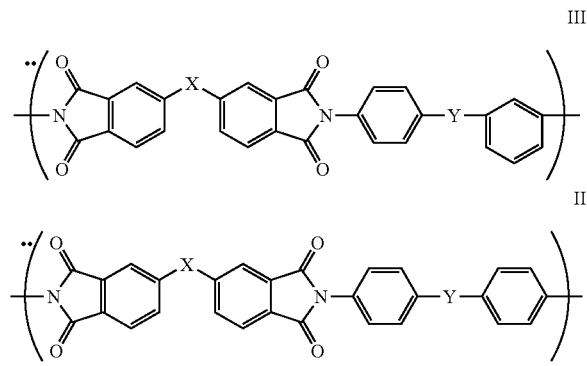

wherein X is —O— or —C(=O)— and Y is —O— or —$SO_2$—.

4. A flame resistant composite material comprising:
   a flame resistant polymer foam; containing
   a flame resistant aerogel;
   wherein the polymer of the polymer foam is flame resistant;
   wherein the composite material further comprises an intervening material between the polymer foam and the aerogel and the polymer foam holds the aerogel immobile relative to the polymer foam by exerting pressure against the aerogel through the intervening material.

5. A flame resistant composite material comprising:
   a flame resistant polymer foam; containing
   a flame resistant aerogel;
   wherein the polymer of the polymer foam is flame resistant;
   wherein the composite material comprises two or more layers of the polymer foam containing one or more layers of aerogel.

6. The composite material of claim 5 wherein the one or more layers of aerogel comprises an aerogel blanket.

7. A flame resistant composite material comprising:
   a flame resistant polymer foam; containing
   a flame resistant aerogel; and
   a cryogen adsorbed to the aerogel.

8. A composite material comprising:
   a polyimide foam; containing
   an aerogel and a cryogen adsorbed to the aerogel.

* * * * *